(12) United States Patent
Lee et al.

(10) Patent No.: US 7,335,884 B2
(45) Date of Patent: Feb. 26, 2008

(54) COMPENSATION CIRCUIT FOR COMPENSATING NON-UNIFORMITY ACCORDING TO CHANGE OF OPERATING TEMPERATURE OF BOLOMETER

(75) Inventors: Hee Chul Lee, Daejeon (KR); Chi Ho Hwang, Daejeon (KR); Yong Soo Lee, Daejeon (KR); Sang Gu Kang, Gyeonggi-do (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 124 days.

(21) Appl. No.: 11/327,461

(22) Filed: Jan. 9, 2006

(65) Prior Publication Data

US 2006/0231760 A1    Oct. 19, 2006

(30) Foreign Application Priority Data

Apr. 15, 2005   (KR) .................... 10-2005-0031339

(51) Int. Cl.
  *G01J 5/02* (2006.01)
(52) U.S. Cl. .............................. 250/339.02; 250/339.03
(58) Field of Classification Search ............ 250/338.1, 250/339.02, 339.03; 374/2, 179, 181, 182
  See application file for complete search history.

(56) References Cited

U.S. PATENT DOCUMENTS

| 6,028,309 A * | 2/2000 | Parrish et al. ............... 250/332 |
| 6,465,785 B1 * | 10/2002 | McManus ................. 250/338.1 |
| 2001/0040216 A1 * | 11/2001 | Knauth et al. ............... 250/352 |
| 2006/0060786 A1 * | 3/2006 | Vilain ...................... 250/338.1 |

* cited by examiner

*Primary Examiner*—David Porta
*Assistant Examiner*—Casey Bryant
(74) *Attorney, Agent, or Firm*—Foley & Lardner LLP

(57) ABSTRACT

The present invention relates to a bolometer, and more specifically to a compensation circuit for compensating non-uniformity due to the difference of operating temperature between bolometers which exist in bolometer array using semiconductor material. A compensation circuit according to the present invention comprises a biasing part including a first transistor generating bias current according to the change of operating temperature to have a dependency of exponential function for the operating temperature of circuit, and a second transistor turned on/off according to the column signal of a bolometer array; a bolometer part including a variable resistor for detecting IR in a pixel base, a third transistor turned on/off according to the column signal of a bolometer array coupled to one end of the variable resistor, and a fourth transistor turned on/off according to the row signal of a bolometer array coupled to the other end of the variable resistor; and an off-set compensation part for compensating the non-uniformity of the bolometer unit.

8 Claims, 5 Drawing Sheets

COMPENSATION CIRCUIT FOR COMPENSATING NON-UNIFORMITY ACCORDING TO CHANGE OF OPERATING TEMPERATURE OF BOLOMETER

This Nonprovisional application claims priority under 35 U.S.C. § 119(a) on Patent Application No. 10-2005-0031339 filed in Republic of Korea on Apr. 15, 2005, the entire contents of which are hereby incorporated by reference.

BACKGROUND OF THE INVENTION

1. Field of the Invention

The present invention relates to a bolometer, and more specifically to a compensation circuit for compensating non-uniformity due to the difference of operating temperatures between bolometers existing in a bolometer array using semiconductor material.

2. Description of the Background Art

FIG. 1 generally represents an IR (Infrared) detector configured by a bolometer with an array of 3×3(3 rows 3 columns) using a semiconductor process.

As shown in FIG. 1, the IR (Infrared) detector configured by the bolometer with the array of 3×3 (3 rows 3 columns) is formed using the semiconductor process. However, it detects respectively different values, which are the temperatures of each bolometer arranged in each array that varies from 301.9° K to 302.3° K, when the temperature of a material is 300.00° K.

Although the bolometer is configured using a semiconductor process, it is not an accurate IR detector because the characteristics per pixel configuring each bolometer are different from each other because of factors, such as material characteristics or change of process.

To solve the described problem, the 2-point amendment method shown in FIG. 2 is used.

FIG. 2a to FIG. 2c represents an amendment process to explain the related art of the 2-point amendment method.

As shown in FIG. 2a, the graph represents that the off-set amendment and the gain-amendment have not been performed in the 2 point method amendment circuit.

Line A represents a value in which an actual bolometer operates, while line B represents a reference value in which a bolometer should operate regardless of operating temperature changes.

The magnitude (offset) and gradient (gain) of line A needs to be changed to have the same magnitude and gradient of line B.

The graph in FIG. 2b illustrates that the 2 point amendment method initially amends the first off-set between Line A and Line B.

Offset amendment means that the magnitude of line A is altered by amending the magnitude (offset) of line A to intersect at the point Qmin within the dotted circle of FIG. 2b.

The graph in FIG. 2c illustrates that the 2 point amendment method then amends the second gain between Line A and Line B.

The second amendment is performed by altering the gradient (gain) with the reference point Qmin for the off-set amended by the process of FIG. 2b.

As described above, the coefficient of the bolometer may be compensated to ideally operate regardless of temperature in the bolometer, by amending the first off-set and amending the second gain.

The 2-point method amendment, however, has a critical problem in that the non-uniformity of reactivity on the operating temperature existing on the bolometer material itself cannot be substantially amended.

An additional problem is that when the 2-point method amendment is performed, the operating temperature of the IR detector must be constantly maintained as the 2-point method is only efficient when the IR detector operating temperature is constantly maintained.

A thermoelectric cooler may be used to ensure that the operating temperature of the IR detector remains constant. However, using a thermoelectric cooler increases power consumption, volume, and costs.

If a thermoelectric cooler is not used, to maintain the operating temperature of the IR detector, the 2-point method amendment will not be able to eliminate above described non-uniformity problem.

To solve the non-uniformity problem, a bias equalization method shown in FIG. 3 is suggested.

FIG. 3 represents the bias equalization method for amending the non-uniformity generated by the change in the operating temperature of pixel composed of conventional bolometer.

As shown in FIG. 3, the bias equalization method is a method where a bias voltage capable of reducing non-uniformity is applied to each bolometer IR detector through Digital-to-Analog Converter 1 (DAC1) DAC1 as a voltage. This method performs an off-set amendment using DAC2 in the first step, and then, performs a gain amendment using DAC2 in the second step.

The gain amendment coefficient is multiplied, and the off-set level existing among the pixels is deleted to amend the gain of each pixel. As a result, non-uniformity of bolometer on IR input may be compensated.

Although the range of amendable temperatures is broader than that of conventional 2-point method, non-uniformity of reactivity on operating temperature existing bolometer material itself cannot be substantially amended. Hence, the need for maintaining temperature of system using bolometer cannot be substantially eliminated.

SUMMARY OF THE INVENTION

Accordingly, an object of the present invention is to solve at least the problems and disadvantages of the background art.

The object of the present invention is to provide a compensation circuit capable of compensating non-uniformity due to operating temperature changes existing on an IR detector over a broad range of operating temperatures.

Another object of the present invention is to eliminate the need for a temperature maintaining device used in a bolometer by providing the compensation circuit.

Another object of the present invention is to provide a small sized IR detector using a bolometer, and to provide a simple circuit for non-uniformity amendment.

A compensation circuit according to the present invention comprises a biasing part including a first transistor for generating a bias current according to the change of an operating temperature of the compensation circuit, wherein the bias current is on the operating temperature of circuit as an exponential function, and a second transistor turned on/off according to the column signal of a bolometer array; a bolometer part including a variable resistor for detecting IR in pixel base, a third transistor turned on/off according to the column signal of a bolometer array coupled to one end of the variable resistor, and a fourth transistor turned on/off according to the row signal of a bolometer array coupled to the other end of the variable resistor; and an off-set compensation part for compensating the non-uniformity of the bolometer unit.

Accordingly, the present invention can compensate non-uniformity due to the operating temperature changes existing in a IR detector over a broad range of operating temperatures.

It is also possible to eliminate the need for a temperature maintaining device used in a bolometer by using a compensation circuit.

By eliminating the temperature maintaining device, it is also possible to provide a small sized IR detector using bolometer and to provide a simple circuit for non-uniformity amendment.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Preferred embodiments of the present invention will be described in a more detailed manner with reference to the drawings.

A compensation circuit according to the present invention comprises a biasing part including a first transistor generating a bias current according to a change in an operating temperature of the compensation circuit, wherein the bias current is dependent on the operating temperature as an exponential function, and a second transistor turned on/off according to the column signal of a bolometer array; a bolometer part including a variable resistor for detecting IR in a pixel base, a third transistor turned on/off according to the column signal of a bolometer array coupled to one end of the variable resistor, and a fourth transistor turned on/off according to the row signal of a bolometer array coupled to the other end of the variable resistor; and an offset compensation part for compensating the non-uniformity of the bolometer part.

In accordance with the present invention, the first transistor is controlled with n-bit digital.

In accordance with the present invention, the compensation circuit further comprises a buffered direct injection part to maintain the biasing current of the biasing part over a broad operating temperature range.

In accordance with the present invention, the buffered direct injection part includes a fifth transistor and a first amplifier, wherein the fifth transistor is serially coupled to the output terminal of the first transistor, wherein the output of the first amplifier turns on/off the fifth transistor and the first amplifier is coupled to the output terminal of the first amplifier to configure a negative feed-back structure.

In accordance with the present invention, the offset compensation part includes a first and a second switch, a first and a second capacitor, and a second amplifier, wherein the off-set compensation part is configured in such a manner that one end of the first switch is coupled to one end of the first capacitor, when the other end of the first capacitor is commonly coupled to the negative terminal of the second amplifier, one end of the second capacitor and one end of the second switch, when the other end of the second capacitor, the other end of the second switch are coupled to the output terminal of the second amplifier, wherein the capacitance ratio of the first capacitor to the second capacitor is varied to perform amplifying according to the turn on/off of the first and the second capacitor.

In accordance with the present invention, the second amplifier is a charge amplifier.

In accordance with the present invention, the amplification ratio is a predetermined ratio of the first capacitance to the second capacitance.

In accordance with the present invention, the compensation circuit further comprises an output part including a third amplifier for operating a great output load by buffering the output of the offset compensation part.

Figure 1:
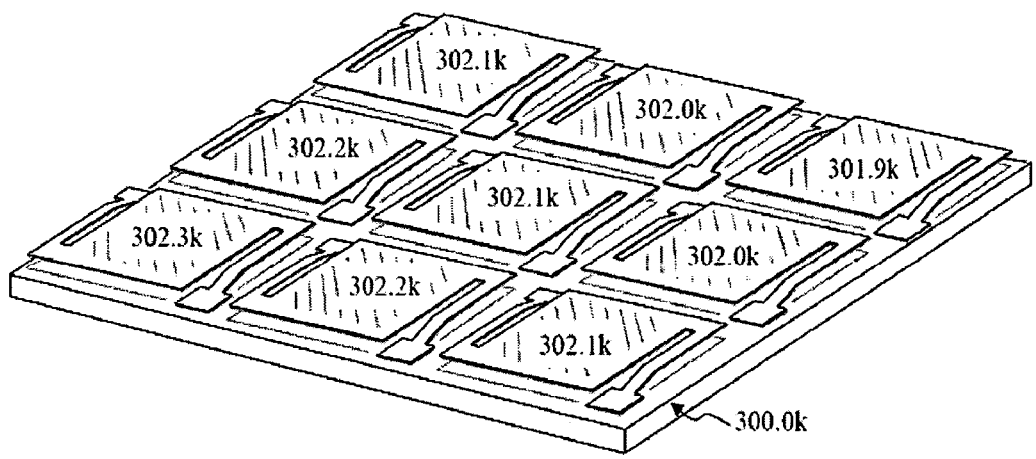
FIG. 1 represents an IR (Infrared) detector configured by each bolometer with the array of 3×3(3 rows 3 columns) using a semiconductor process.
Figure 2A:
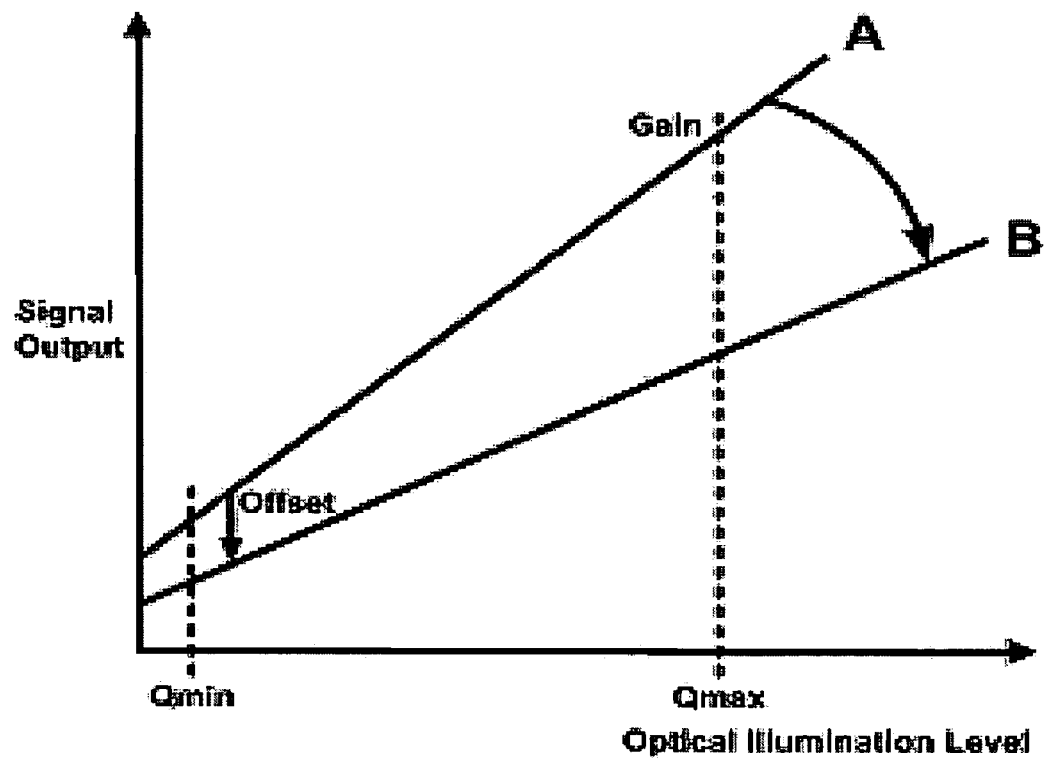
FIG. 2a to FIG. 2c represent an amendment process relating to the 2-point amendment method.
Figure 2B:
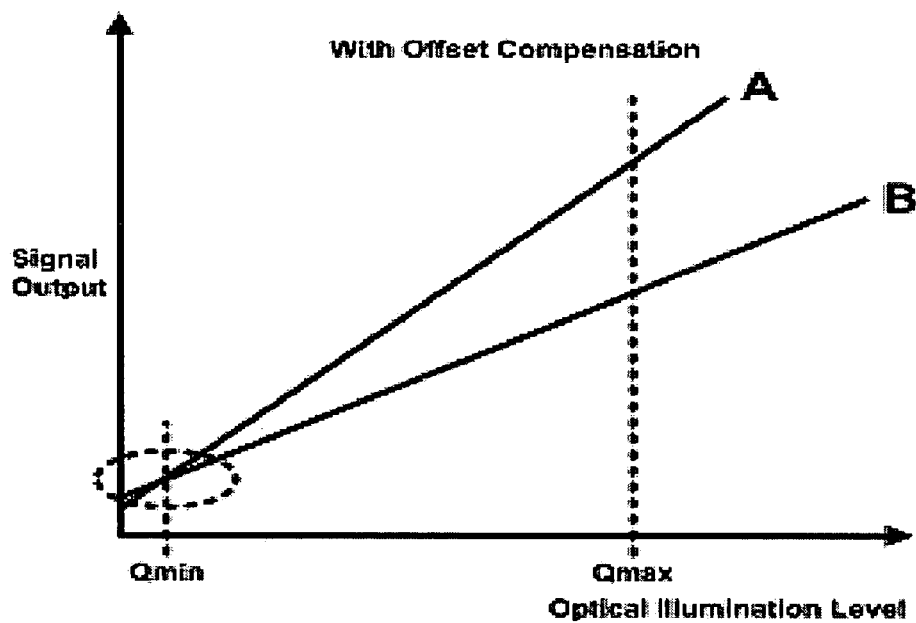
Figure 2C:
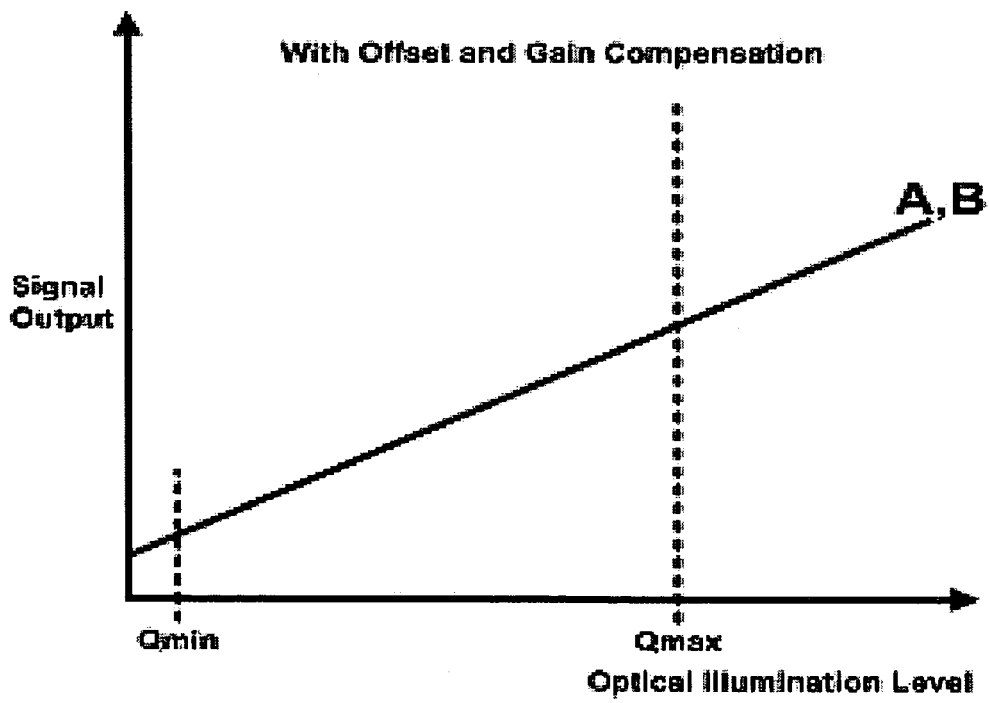
Figure 3:
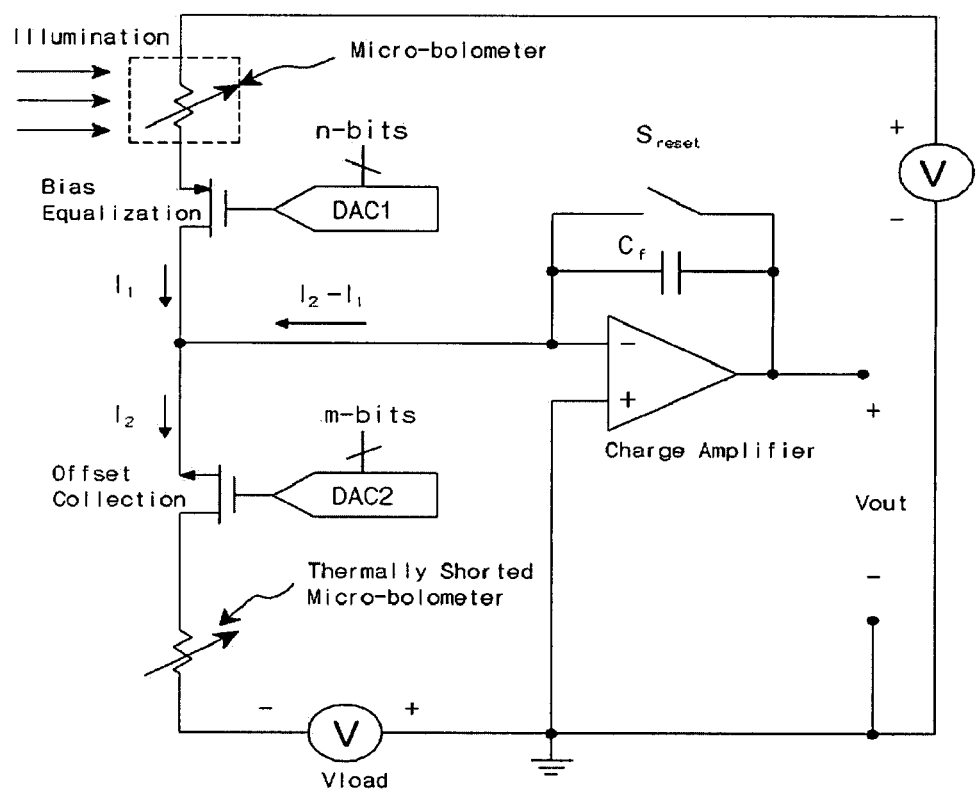
FIG. 3 represents a bias equalization method for amending non-uniformity due to the operating temperature changes of a pixel composed of a conventional bolometer.
Figure 4:
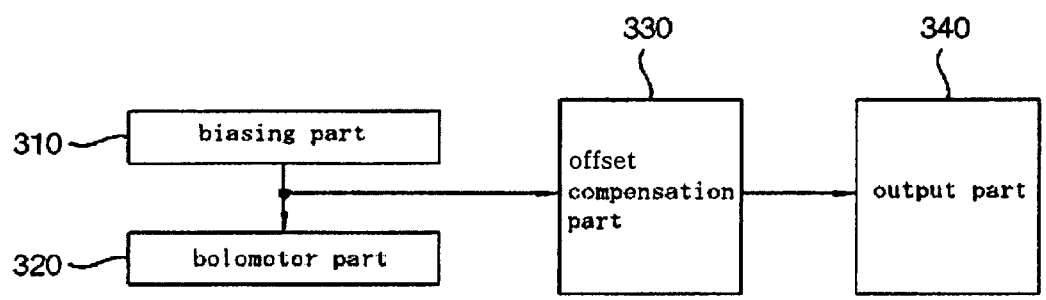
FIG. 4 is a block diagram representing a compensation circuit that compensates non-uniformity due to the operating temperature changes of a bolometer according to the present invention.

FIG. 4 is a block diagram representing a compensation circuit that compensates non-uniformity due to the operating temperature changes of a bolometer according to the present invention.

As shown in FIG. 4, the compensation circuit comprises a biasing part 310, a bolometer part 320, an off-set compensation part 330, and an output part 340.

The biasing part 310 generates a bias current with the change of operating temperature to have dependancy of exponential function for the operation temperature.

The bolometer part 320 performs IR detection based on the pixel unit and the offset compensation part 330 compensates non-uniformity of the bolometer unit.

The output part 340, when an amplifier is included, will amplify the output of the offset compensation part 330.

A more detailed configuration of FIG. 4 will be described below.

A MOSFET device may be used as a transistor in an embodiment of the present invention. A MOSFET device determines the quantity and direction of current that flows from a drain to a source or vice versa according to the magnitude and the polarity of the voltage applied to a gate.

A BJT, JFET, MOSFET or a MESFET device may be used as an amplifying device in the present invention. However, it will be mainly described in conjunction with the use of MOSFET device.

As such, the concept and scope of the present invention are not limited to using a MOSFET device.

Figure 5:
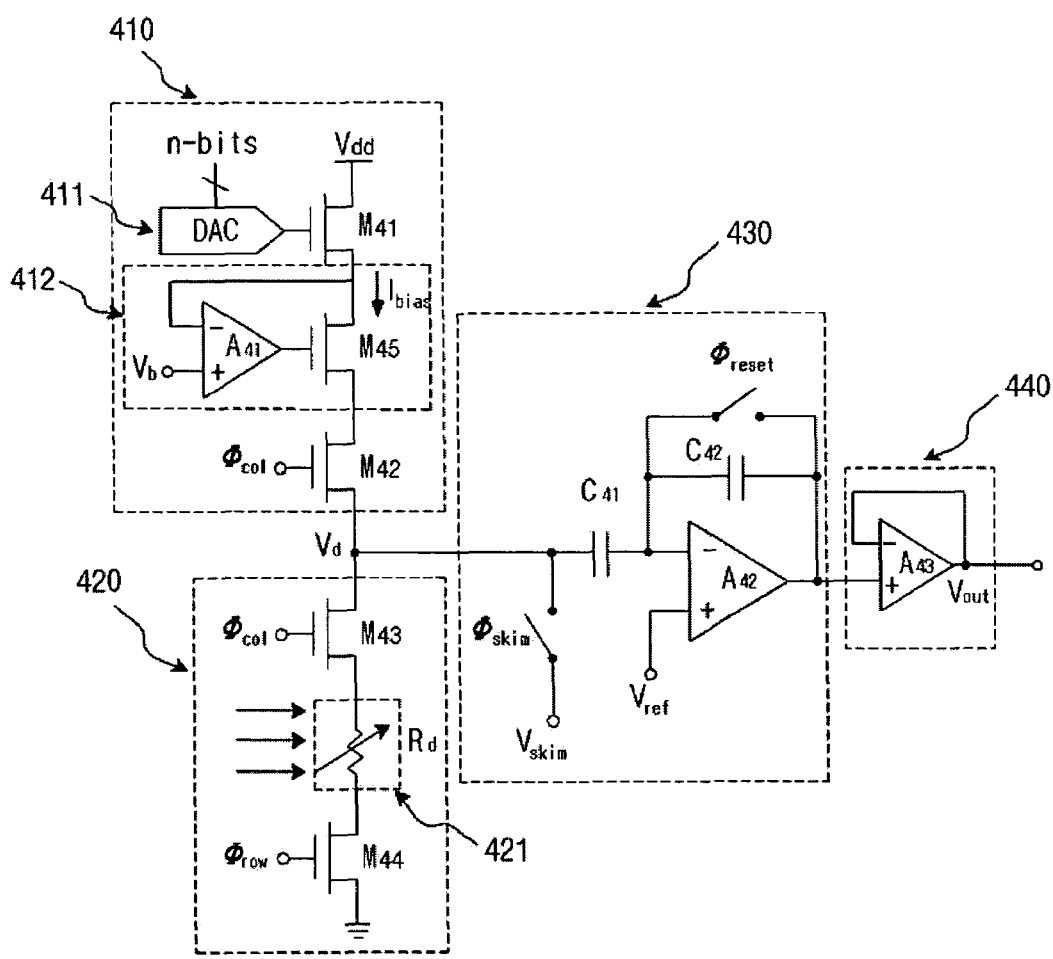
FIG. 5 is a circuit diagram representing a compensation circuit that compensates non-uniformity due to the operating temperature changes according to an embodiment of the present invention.

FIG. 5 is a circuit diagram representing a compensation circuit that compensates non-uniformity due to operating temperature changes according to an embodiment of the present invention.

As shown in FIG. 5, the compensation circuit comprises a biasing part 410, a bolometer part 420, an off-set compensation part 430, and an output part 440.

The biasing part 410 have a dependancy of exponential function for the operation temperature. The biasing part 410 comprises a first transistor M41 for generating a bias current when the operating temperature changes and a second transistor M42 that turns on and off according to the column signal of the bolometer array.

The biasing part 410 further comprises a buffered direct injection part 412 for uniformly maintaining a biasing current over a broad operating temperature range.

The buffered direct injection uni 412 comprises a fifth transistor M45 and a first amplifier A41. The fifth transistor M45 is coupled to an output terminal of a first transistor M41. The output of the first amplifier A41 turns on/off the fifth transistor M45. The first amplifier A41 is coupled to the output terminal of the first transistor M41. The buffered direct injection part 412 is configured as a negative feedback type.

A bolometer part 420 includes a third transistor M43 and a fourth transistor M44 for detecting IR in a pixel base. The third transistor M43 is turned on/off according to a variable resistor Rd and a column signal φcol of a bolometer array coupled to one end of the variable resistor Rd. The fourth transistor M44 is turned on/off according to a row signal φrow of the bolometer array coupled to the other end of the variable resistor Rd.

An offset compensation part 430 includes a first switch φskim, a second switch φreset, a first capacitor C41, a second capacitor C42, and a second amplifier A42 to compensate for non-uniformity.

One end of the first switch φskim is coupled to one end of the first capacitor C41. The other end of the first switch φskim is coupled to φskim.

One end of the first capacitor C41 is coupled to the first switch φskim. The other end of the first capacitor C41 is commonly coupled to a negative input terminal of the second amplifier A42, one end of the second capacitor C42, and one end of the second switch φreset.

One end of the second capacitor C42 is coupled to a common terminal between one end of the second capacitor C42 and one end of the second switch φreset. The other end of the second capacitor C42 is coupled to an output terminal of the second amplifier A42. The second switch preset is coupled in parallel with the second capacitor C42.

The operation of the compensation circuit according to the present invention will be described as follows.

Among the various materials used for detecting IR of a bolometer, the bolometer using a semiconductor material is generally used because it can attain a higher Temperature Coefficient of Resistance TCR value than the value attainable when other materials are used.

The resistance of a semiconductor material such as a-Si, poly-Si, and Si—Ge are described in Equation 1.

$$R = R_o \cdot T^{-\frac{3}{2}} e^{\frac{b}{kT}} \qquad \text{[Equation 1]}$$

R0 represents an initial resistance. b represents a constant determined by the physical characteristics of the bolometer material. kT represents an absolute temperature.

Changes to characteristics of the bolometer will cause a change to the value of the constant. As a result, each bolometer has a different resistance curve for the change of operation temperature.

A first transistor M41 of the biasing part 410 operates in a subthreshold region. By setting the operation region in this way, a dependency of exponential function for operating temperature is appeared.

The bias current Ibias for the operating temperature changes of the circuit is described in Equation 2.

$$I_{bias} = I_o \cdot e^{-\frac{V_{DAC}}{nkT}} \qquad \text{[Equation 2]}$$

I0 represents an initial current. VDAC represents a voltage applied to a gate terminal of the first transistor. n represents a constant. kT represents the absolute temperature.

The gate terminal of the first transistor M41 is biased by a Digital to Analogue Converter DAC 411 which transforms digital values into analogue values to control n-bit digital. The biasing part 410 further comprises the buffered direct injection part 412.

The buffered direct injection part 412 operates the gate voltage of the fifth transistor to maintain the source voltage of the fifth transistor M45 in the reference voltage Vb by the first amplifier A41 implemented as a negative feed back type.

On account of the buffered direct injection part 412, the change of voltage between source and drain terminal of the fifth transistor M45 could be minimized so that bias current Ibias is changed only when the gate voltage of the first transistor M41 changes.

The generated bias current is applied to the bolometer part 420. When the bias current is applied, the voltage difference Vd between both ends of resistance Rd 421 of the bolometer is described in Equation 3, when φrow and φcolumn is turned on by row signal φrow and column signal φcolumn.

$$V_d = R_o \cdot I_o \cdot T^{-\frac{3}{2}} e^{\frac{1}{kT}\left(b + \frac{V_{DAC}}{n}\right)} \qquad \text{[Equation 3]}$$

R0 and b represent a constant determined by the physical characteristics of the bolometer, and other unknown quantity is the same as Equation 2.

When the second switch φreset of output terminal is turned on, the voltage Vd is stored in the first capacitor C41. When the φrow, φcolumn, and the second switch φreset are turned off, and the first switch φskim is turned on, Vskim is subtracted from Vd, then, the output is made through an amplifying process in the ratio of the capacitance of the first capacitor C41 to the second capacitor C42, i.e. C41/C42.

As described above, signals can be amplified by eliminating off-set level. The output of the second amplifier A42 is buffered in the third amplifier A43 included in the output part 440 to operate a great output load. Preferably, the second amplifier A42 is a charge amplifier.

The output voltage is described in Equation 4.

$$V_{out} = V_{ref} + \frac{C_1}{C_2} \cdot (V_{skim} - V_d) \qquad \text{[Equation 4]}$$

Vref represents a reference voltage of the second amplifier A42. C1 and C2 represent the capacitance of the first and the second capacitor.

By using the compensation circuit, it is possible to eliminate the non-uniformity existing between bolometers by controlling the output of D/A converter DAC for the bias current applied to each pixel.

The result of a simulation according to an embodiment of the present invention will be described.

Figure 6A:
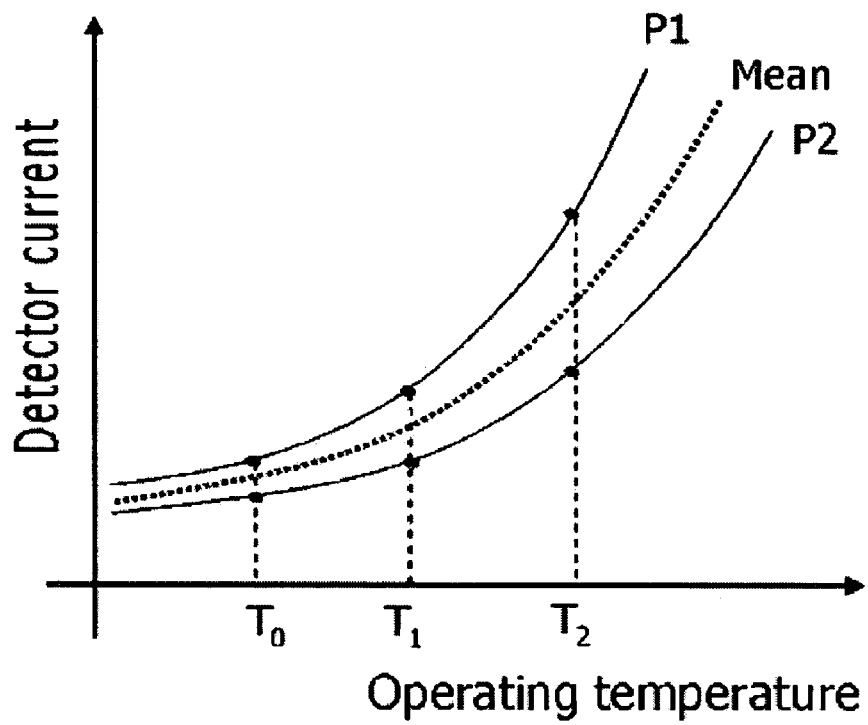
FIG. 6a represents a graph in which non-uniformity due to operating temperature changes are not compensated.

FIG. 6a represents a graph in which non-uniformity due to an operating temperature change is not compensated.

As shown in FIG. 6a, the two-dimension graph represents the current of a bolometer due to the operating temperature of bolometer. The graph shows the values P1, P2 measured in two bolometers when the operating temperature is T0, T1, and T2 for the same light.

By using the measured values, the mean value of the two bolometers can be acquired. The mean value can make the signal changes of bolometer due to temperature to be most similar for each pixel. As a result, it is possible to control the coefficient of non-uniformity compensation for R0 and b.

The coefficient measured by the method described above is stored in memory after performing the measuring. The compensation is performed with referring non-volatile memory when IR detector operates.

Figure 6B:
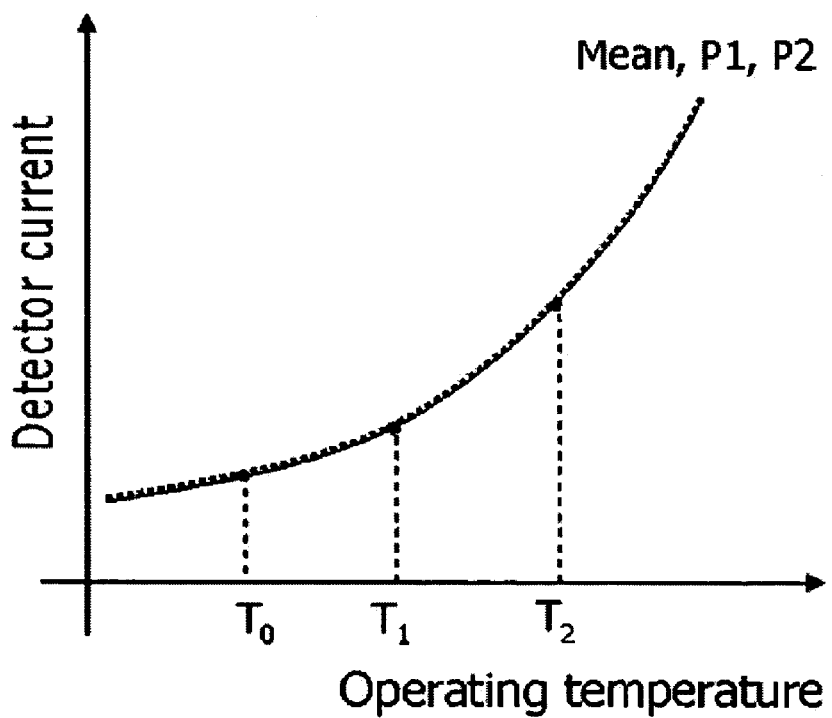
FIG. 6b represents a graph in which non-uniformity due to operating temperature changes have been compensated and shows the results of a simulation of the present invention.

FIG. 6b shows a graph in which non-uniformity due to the operating temperature change has been compensated and it shows the result of the simulation according to the present invention.

As shown in FIG. 6b, the two-dimension graph represents the current of the bolometer due to the operating temperature of bolometer. It shows a graph in which values P1, P2 measured in two bolometers are compensated in the operating temperature T0, T1, and T2 with the same light.

The present invention can eliminate the factor of non-uniformity the bolometer has by performing again conventional two point compensation after acquiring the coefficient through the process described above. As a result, the necessity of temperature maintenance device in a system using bolometer is removed and the complexity of circuit necessary for compensation is minimized so that the total system could be simplified.

The invention being thus described, may be varied in many ways. Such variations are not to be regarded as a departure from the spirit and scope of the invention, and all such modifications as would be obvious to one skilled in the art are intended to be included within the scope of the following claims.

What is claimed is:

1. A compensation circuit for compensating non-uniformity due to a change of operating temperature of a bolometer, the circuit comprising:
    a biasing part including a first transistor for generating a bias current according to a change in an operating temperature of the compensation circuit, wherein the bias current is dependent on the operating temperature as an exponential function, and a second transistor turned on/off according to the column signal of a bolometer array;
    a bolometer part including a variable resistor for detecting IR in pixel base, a third transistor turned on/off according to the column signal of a bolometer array coupled to one end of the variable resistor, and a fourth transistor turned on/off according to the row signal of a bolometer array coupled to the other end of the variable resistor; and
    an offset compensation part for compensating the non-uniformity of the bolometer unit.

2. The compensation circuit of claim 1, wherein the first transistor is controlled by n-bit digital.

3. The compensation circuit of claim 1, further comprising a buffered direct injection part to maintain biasing current of the biasing part in a broad operating temperature range.

4. The compensation circuit of claim 3, wherein the buffered direct injection part includes a fifth transistor and a first amplifier,
    wherein the fifth transistor is serially coupled to the output terminal of the first transistor,
    wherein the output of the first amplifier turns on/off the fifth transistor and the first amplifier is coupled to the output terminal of the first amplifier to configure a negative feed-back structure.

5. The compensation circuit of claim 1, wherein the off-set compensation part includes a first and a second switch, a first and a second capacitor, and a second amplifier,
    wherein the off-set compensation part is configured in such a manner that one end of the first switch is coupled to one end of the first capacitor, when the other end of the first capacitor is commonly coupled to the negative terminal of the second amplifier, one end of the second capacitor and one end of the second switch, when the other end of the second capacitor, the other end of the second switch are coupled to the output terminal of the second amplifier,
    wherein the capacitance ratio of the first capacitor to the second capacitor is varied to perform amplifying according to a turn on/off of the first and the second capacitor.

6. The compensation circuit of claim 5, wherein the second amplifier is a charge amplifier.

7. The compensation circuit of claim 5, wherein the amplification ratio is a predetermined ratio of the first capacitance to the second capacitance.

8. The compensation circuit of claim 1, further comprising an output part including a third amplifier for operating a great output load by buffering the output of the off-set compensation part.

* * * * *